US010805394B2

(12) United States Patent
Kamei et al.

(10) Patent No.: US 10,805,394 B2
(45) Date of Patent: Oct. 13, 2020

(54) FILE SERVER APPARATUS HAVING SHARED FILE SYSTEM WITH FILE AND DIRECTORY OPERATION PROCESSING

(71) Applicant: Hitachi, Ltd., Tokyo (JP)

(72) Inventors: Hitoshi Kamei, Tokyo (JP); Masanori Takata, Tokyo (JP); Akiyoshi Tsuchiya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 151 days.

(21) Appl. No.: 15/540,041

(22) PCT Filed: Jan. 30, 2015

(86) PCT No.: PCT/JP2015/052658
§ 371 (c)(1),
(2) Date: Jun. 27, 2017

(87) PCT Pub. No.: WO2016/121093
PCT Pub. Date: Aug. 4, 2016

(65) Prior Publication Data
US 2018/0013827 A1 Jan. 11, 2018

(51) Int. Cl.
G06F 16/00 (2019.01)
H04L 29/08 (2006.01)
(Continued)

(52) U.S. Cl.
CPC ...... H04L 67/1097 (2013.01); G06F 12/0868 (2013.01); G06F 16/176 (2019.01);
(Continued)

(58) Field of Classification Search
CPC .............................. G06F 16/176; G06F 16/182
(Continued)

(56) References Cited

U.S. PATENT DOCUMENTS

2006/0085487 A1* 4/2006 Hara ...................... G06F 16/181
2010/0333116 A1* 12/2010 Prahlad ............... G06F 16/1844
719/328
(Continued)

FOREIGN PATENT DOCUMENTS

JP 2014-503086 A 2/2014
WO 2014/174578 A1 10/2014

OTHER PUBLICATIONS

Brent Callaghan, "NFS Bible", First edition, Ascii Corp., Oct. 1, 2001, pp. 251-253.
(Continued)

Primary Examiner — Thu Nguyet T Le
(74) Attorney, Agent, or Firm — Mattingly & Malur, PC

(57) ABSTRACT

A file server apparatus includes a second file system volume including cache data of a first file system volume stored in a shared file storage apparatus. The file server apparatus determines the operation type indicated by an access request to the first file system volume from a client. When the operation type is directory operation, the file server sends an instruction of directory operation to the shared file storage apparatus, and then transmits a completion response to the client. When the operation type is file operation, the file server apparatus executes a file operation in the second file system volume, transmits a completion response to the client, and then transmits a file operation instruction to the shared file storage apparatus.

12 Claims, 12 Drawing Sheets

(51) Int. Cl.
*G06F 16/176* (2019.01)
*G06F 16/182* (2019.01)
*G06F 12/0868* (2016.01)

(52) U.S. Cl.
CPC .... *G06F 16/182* (2019.01); *G06F 2212/1024* (2013.01); *G06F 2212/263* (2013.01); *G06F 2212/314* (2013.01); *G06F 2212/463* (2013.01); *G06F 2212/466* (2013.01)

(58) Field of Classification Search
USPC .................................................. 707/822, 826
See application file for complete search history.

(56) References Cited

U.S. PATENT DOCUMENTS

| 2012/0259813 | A1 | 10/2012 | Takata et al. |
| 2013/0117240 | A1 | 5/2013 | Taylor et al. |
| 2015/0227550 | A1 | 8/2015 | Matsuki et al. |

OTHER PUBLICATIONS

Hiroshi Tsukada et al., "A File Synchronization System for Cooperative Work via the Internet", IPSJ SIG Technical Report, Aug. 3, 2005, vol. 2005, No. 79, pp. 33-40. (cited in international search report).
International Search Report of PCT/JP2015/052658 dated Mar. 24, 2015.

\* cited by examiner

FILE SERVER APPARATUS HAVING SHARED FILE SYSTEM WITH FILE AND DIRECTORY OPERATION PROCESSING

BACKGROUND

The present invention relates to a file server apparatus.

A distributed file sharing function which reads/writes one file from/to plural sites is known. As an embodiment of the distributed file sharing function, a system which combines one CAS (Content Addressable Storage) device and a plurality of NAS (Network Attached Storage) devices arranged for respective sites is known. In this system, the CAS apparatus and the NAS apparatuses are mutually connected by a WAN (Wide Area Network). The low communication speed of the WAN degrades response performance of a file operation by an end user.

Patent Document 1 discloses a distributed file system including a plurality of cloud controllers which receive access from clients. The plurality of cloud controllers caches data of the distributed file system stored in the cloud storage system (Abstract, for example). The cache data allows avoiding of degradation of response performance.

Furthermore, Patent Document 1 discloses a method of maintaining the consistency of file data by locking the file. While the file is locked, cloud controllers other than the allowed cloud controller are prohibited to update the file data.

Patent Document 2 discloses a file server system in which a plurality of edge servers have a plurality of home directories associated with one core space. When a communication failure occurs between one home directory and the core space, a user can access the core space via another home directory.

When a communication failure occurs between the edge server 1 and the core space, files and directories different from the files and directories in the core space among the files and directories in the home directory 1 of the edge server 1 are copied to a "conflict" directory. When the communication failure is removed, the "conflict" directory is migrated to the core space. This avoids the occurrence of reversal in the core space (paragraph 0145, for example).

Patent Document 1: US2013/0117240 A1
Patent Document 2: WO2014/174578 A1

SUMMARY

In a distributed file system where a plurality of NAS apparatuses access a single CAS apparatus, when NAS apparatuses cache objects (including files and directories), a namespace consistency problem occurs. For example, when the path of a file created by a NAS apparatus 1 is equal to the path of a directory created by a NAS apparatus 2, and the NAS apparatus 1 and the NAS apparatus 2 transmit cached objects to the CAS apparatus, the objects collides. As a result, one of the objects is not entered to the file system of the CAS apparatus and is invalid.

The lock function as disclosed in Patent Document 1 can guarantee the consistency of the namespace. However, since file operations are possible only on the NAS apparatus which has acquired the lock, other NAS apparatuses cannot execute their file operations and the usability drops.

Using the technique disclosed in Patent Document 2, it is possible to solve the namespace consistency problem by moving an object which collides with a special directory ("conflict" directory).

Collisions tend to occur in a system without a lock function, and a move of a collided object involves moves of many objects. In particular, when a directory is moved to a special directory, all the objects stored under the moved directory are moved to the special directory, and the namespace is greatly changed. As a result, it is necessary for a user to search the special directory for a desired file, which reduces usability.

Therefore, desired is a technology for improving usability in a file sharing system enabling file operations from a plurality of file servers.

A representative example of the present invention is a file server apparatus configured to share a first file system volume stored in a shared file storage apparatus with another file server apparatus, and mediate accesses from a client to the first file system volume. The file server apparatus includes a second file system volume including cache data of the first file system volume, and a controller. The controller is configured to receive an access request to the first file system volume from the client; determine an operation type indicated by the access request. The controller is configured to transmit, when the operation type is directory operation, a completion response of the directory operation to the client after transmitting an instruction of the directory operation in the first file system volume to the shared file storage apparatus. The controller is configured to transmit, when the operation type is file operation, an instruction of the file operation in the first file system volume to the shared file storage device after executing the file operation in the second file system volume and transmitting a completion response of the file operation to the client.

According to an aspect of the present invention, it is possible to improve usability in a file sharing system.

DETAILED DESCRIPTION OF THE EMBODIMENTS

Figure 1A:
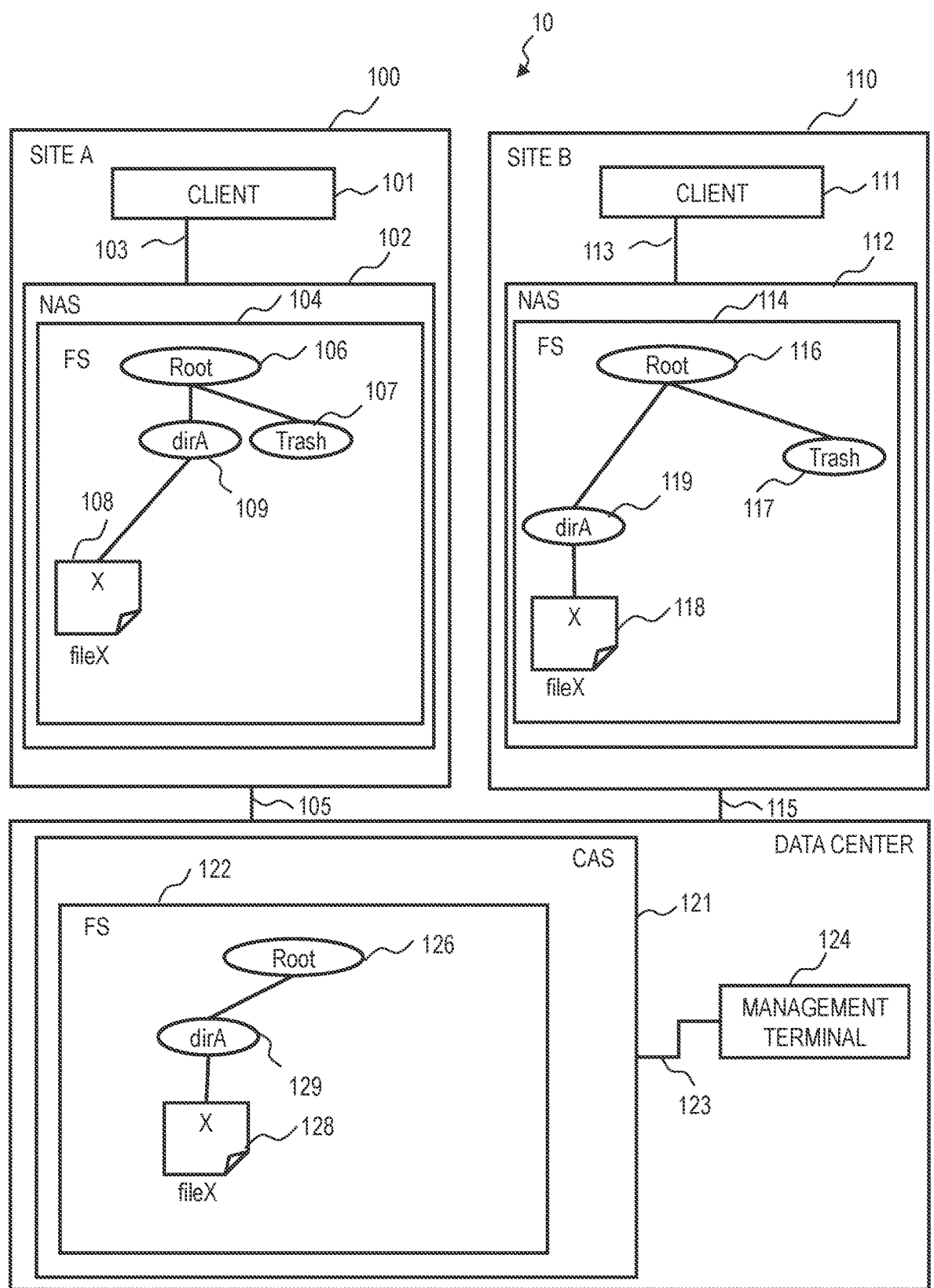
FIG. 1A depicts a configuration example of a file sharing system.

Hereinafter, embodiments of the present invention will be described with reference to the accompanying drawings. It should be noted that embodiments are merely examples for realizing the present invention and does not limit the technical scope of the present invention. The same reference numerals are given to a common configuration element in the drawings.

A file sharing system disclosed below includes a plurality of NAS (Network Attached Storage) apparatuses and a CAS (Content Addressable Storage) apparatus. The plurality of NAS apparatuses share a file system volume of the CAS apparatus and store their cache data in the file system volume. Each of the plurality of NAS apparatuses mediates access by a client to the file system volume of the CAS. Each NAS apparatus instructs, in synchronism with directory operations from clients, the CAS apparatus to perform the directory operations, and instructs, asynchronously with file operations from the clients, the CAS apparatus to perform the file operations. This can reduce waiting time of the clients for the file operations while avoiding namespace consistency problems.

FIG. 1A depicts a schematic configuration of a file sharing system 10 of the present embodiment. In the present embodiment, a site A 100 and a site B 110 share a file via a data center 120. The site A 100 and the site B 110 are connected with the data center 120 via a WAN (Wide Area Network) 105 and a WAN 115, respectively. Although FIG. 1 depicts only the site A 100 and the site B 110, more sites may be included in the system The site A 100 and the site B 110 have a client 101 and a client 111. The client 101 and the client 111 are connected with a NAS apparatus 102 and a NAS apparatus 112 via a communication path 103 and a communication path 113, respectively. The NAS apparatus is an example of a file server apparatus which provides file sharing service, and a file server apparatus of another configuration may be used.

The communication path 103 and the communication path 113 are configured by a LAN (Local Area Network) or the like. The configuration of the communication path 103 and the communication path 113 is not limited to the LAN.

The client 101 and the client 111 are computers which use the file sharing service provided by the NAS apparatus 102 and the NAS apparatus 112. The client 101 and the client 101 use a file sharing protocol such as Network File System (NFS) and Common Internet File System (CIFS) to use the file sharing service provided by the NAS apparatus 102 and the NAS apparatus 112 via the communication path 103 and the communication path 113.

A file system (FS) 104 is constructed in the NAS 102 of the site A 100. The file system 104 is a namespace for managing objects such as files and directories created by the client 101 and storing data. The file system 104 manages files from the root directory 106 using the file tree.

In FIG. 1A, a save directory 107 and a directory A 109 are created under the root directory 106. In addition, a file 108 is created under the directory A 109.

Similarly, a file system 114 is constructed in the NAS apparatus 112 of the site B 110. The file system 114 manages objects such as files and directories and stores data. In FIG. 1A, the file system 114 is in a state synchronized with the file system 104 of the NAS apparatus 102 via the file system 122 of the CAS apparatus 121, and the directories and files other than the save directory 107 of the file system 104 are the same as the directories and files of the file system 114.

Specifically, a save directory 117 and a directory A 119 are created under the root directory 116 in the file system 114. In addition, a file 118 is created under the directory A 119. The root directory 116, the directory A 119, and the file 118 correspond to the root directory 106, the directory A 109, and the file 108, respectively. The files in the save directory 107 and the files in the save directory 117 may be different.

The data center 120 has a CAS (Content Addressable Storage) apparatus 121 for storing files and directories shared by the site A 100 and the site B 110, and a management terminal 124. The CAS apparatus 121 and the management terminal 124 are connected by a network 123.

In the CAS apparatus 121, a file system 122 is constructed. The CAS apparatus 121 is an example of a shared file storage apparatus, and a shared file storage apparatus of another configuration may be used. The file system 122 of the CAS apparatus 121 is shared by the NAS apparatuses 102 and 112. The NAS apparatuses 102 and 112 mediate accesses to the file system 122 from the clients 101 and 111, respectively.

The file systems 104 and 114 of the NAS apparatuses 102 and 112 store cache data of the file system 122 of the CAS apparatus 121. The file system 122 stores objects such as files and directories which the NAS apparatus 102 of the site A 100 and the NAS apparatus 112 of the site B 110 exchange with the CAS apparatus 121.

In FIG. 1A, the file system 122 and the file systems 104 and 114 of the NAS apparatuses 102 and 112 are in a synchronized state. Updates in the file system 104 and the file system 114 are mutually reflected via the file system 122 of the CAS apparatus 121.

The file tree of the objects stored in the file system 122 is the same as the file tree shared by the NAS apparatus 102 and the NAS apparatus 112. For example, in the configuration example of FIG. 1, "/dir A/file X" is stored in the file system 122 of the CAS apparatus 121. In this manner, the file systems 104 and 114 include cache data of the file system 122, and the file systems 104 and 114 include the tree structure of the file system 122.

The CAS apparatus 121 manages files and directories as objects each composed of content and metadata, and retrieves the objects. The content is accompanied by the metadata (attributes of the content), and a unique object identifier is assigned to the content. The content is a byte stream, and the metadata is additional information concerning attributes such as object type, creation date and time, retention period, last update date, access authority, size, and the like.

The content of a directory object includes, for example, information on a file and a directory immediately under the directory, and the content of a file object includes user data of the file.

Each of the NAS apparatuses 102, 112 creates an object identifier and sends it to the CAS apparatus 121 together with a new object for storing the new object. Existing objects in the CAS apparatus 121 can be accessed using the object identifiers. The file system 122 of the CAS apparatus 121 stores and manages objects. The information contained in all the directory objects includes the information on the namespace similar to the namespaces of the NAS apparatuses 102, 112, as described above.

The management terminal 124 is a terminal for managing the file sharing system 10. The management terminal 124 has general computer configuration and has an input/output device used by a user in addition to a processor, a memory, and a network interface.

The management terminal 124 manages the CAS apparatus 121, the NAS apparatus 102, and the NAS apparatus 112 via the networks 123, 105, and 115, respectively. For example, the management terminal 124 updates setting information, starts operations, and stops the operations of the CAS apparatus 121, the NAS apparatus 102, and the NAS apparatus 112. In addition, the management terminal 124 manages the accounts of the client 101 and the client 111, for example.

Data read/written by the client 101 at the site A 100 is stored in the file system 104 created by the NAS apparatus 102 as a file or files. Similarly, data read/written by the client 111 of the site B 110 is stored in the file system 114 created by the NAS apparatus 112.

As described above, the file system 104 of the NAS apparatus 102 and and the file system 114 of the NAS apparatus 112 function as caches of the file system 122 of the CAS apparatus 121, respectively. The file sharing system 10 maintains the consistency between the namespaces of the file system 104 of the site A 100, the file system 114 of the site B 110, and the file system 122 of the data center 120. A file stored in the file system of each site is transmitted to the data center 120 when a predetermined condition is satisfied, for example, periodically or in response to occurrence of a prescribed event, and the transmitted data is stored in the file system 122 of the CAS apparatus 121.

In addition, the NAS apparatus at each site incorporates the namespace and files of the file system 122 of the CAS apparatus 121 into the file system of the NAS apparatus when a predetermined condition is satisfied, for example, periodically or in response to occurrence of a prescribed event (data synchronization process S602 described later).

In the present embodiment, information on file operations in the file system 104/114 of the NAS apparatus 102/112 is asynchronously transmitted to the CAS apparatus 121. On the other hand, information on directory operations in the file system 104/114 of the NAS apparatus 102/112 is synchronously transmitted to the CAS apparatus 121.

Upon receiving a file operation from the client 101/111, the NAS apparatus 102/112 returns the process result (completion response) of the file operation to the client 101/111 without waiting for the CAS apparatus 121 to incorporate the file operation to the file system 122. Upon receiving a directory operation from the client 101/111, the NAS apparatus 102/112 waits for the CAS apparatus 121 to incorporate the directory operation into the file system 122, and returns the processing result of the directory operation to the client 101/111.

Figure 1B:
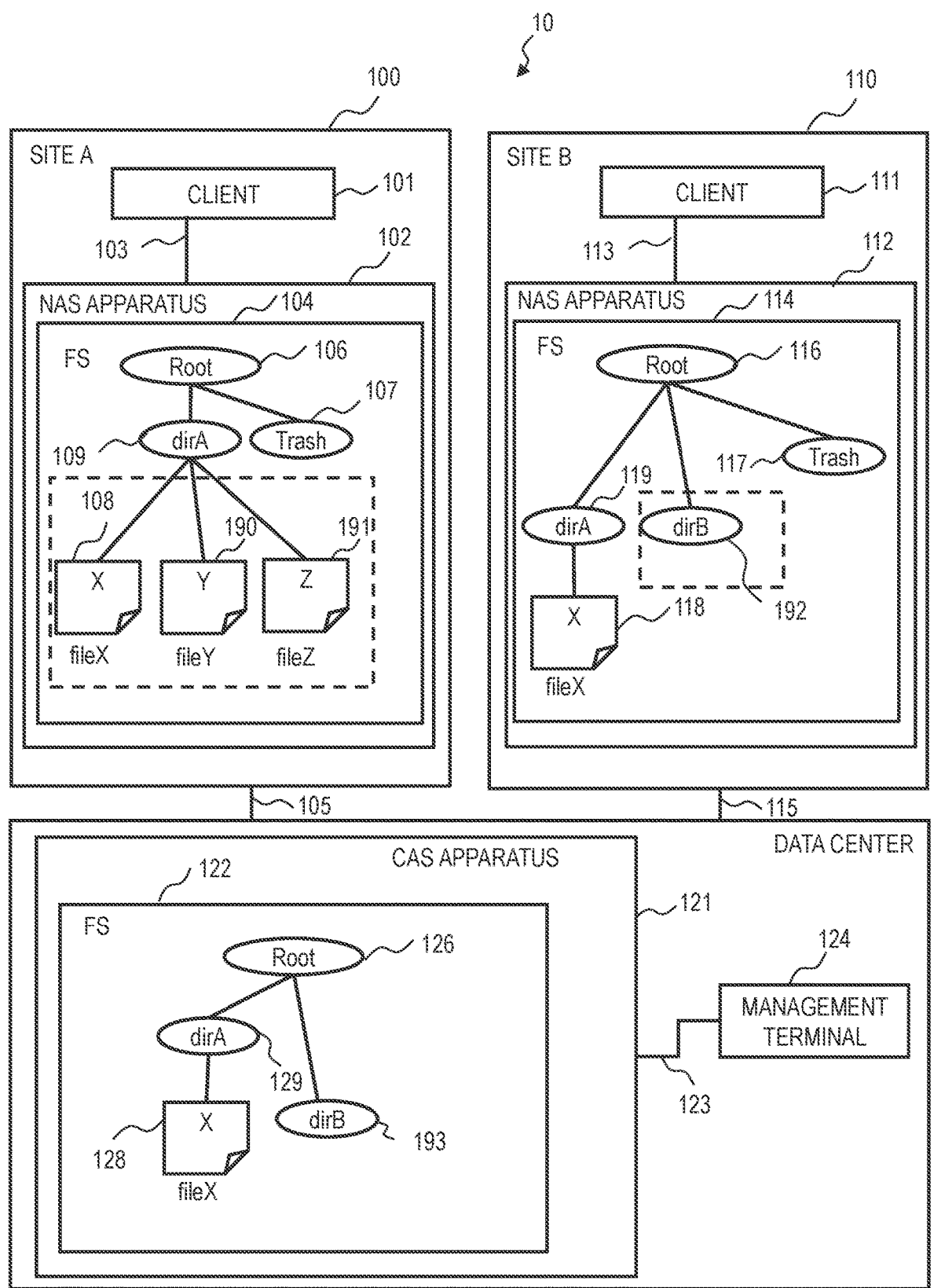
FIG. 1B depicts a configuration example of a file sharing system.

FIG. 1B depicts an example of transmitting information on an object operation in the file systems 104/114 of the NAS apparatus 102/112 to the file system 104 of the CAS apparatus 121. In FIG. 1B, data of a file X 108 is updated in the file system 104 of the NAS 102, and a file Y 191 and a file Z 192 are newly created.

These updates of the file system 104 are cached in the file system 104, have not yet been transmitted to the CAS 121, and have not yet been incorporated into the file system 122 of the CAS apparatus 121. Information on these updates of the file system 104 is transmitted collectively to the CAS apparatus 121 when a specific condition is satisfied.

On the other hand, a directory B 192 is newly created in the file system 104 of the NAS apparatus 102. In response to the creation of the directory B 192, the information on the creation of the directory B 192 is transmitted to the CAS apparatus 121, and the directory B 193 is created in the file system 122 of the CAS apparatus 121. For every directory operation from the client, information on the directory operation is transmitted to and incorporated into the CAS apparatus 121.

As described above, information on a file operation in a NAS apparatus at a site is cached in the NAS apparatus, and information on file operations is transmitted collectively to the CAS apparatus 121 when a specific condition is satisfied.

On the other hand, information on each directory operation is immediately transmitted to the CAS 121 without being combined with information on other operations.

In incorporating a directory operation into the file system 122 in the CAS apparatus 121, the NAS apparatus of the update information transmission source acquires the lock. The lock is acquired for all or part of the file system 122. When two received file operations conflict with each other, the CAS apparatus 121 incorporates the previously received file operation into the file system 122.

Incorporating asynchronously information on a file operation into the file system 122 of the CAS apparatus 121 and synchronously information on a directory operation into the file system 122 of the CAS apparatus 121 improves usability of file operations with the consistency between the namespaces of the file sharing system 10 guaranteed.

Figure 2:
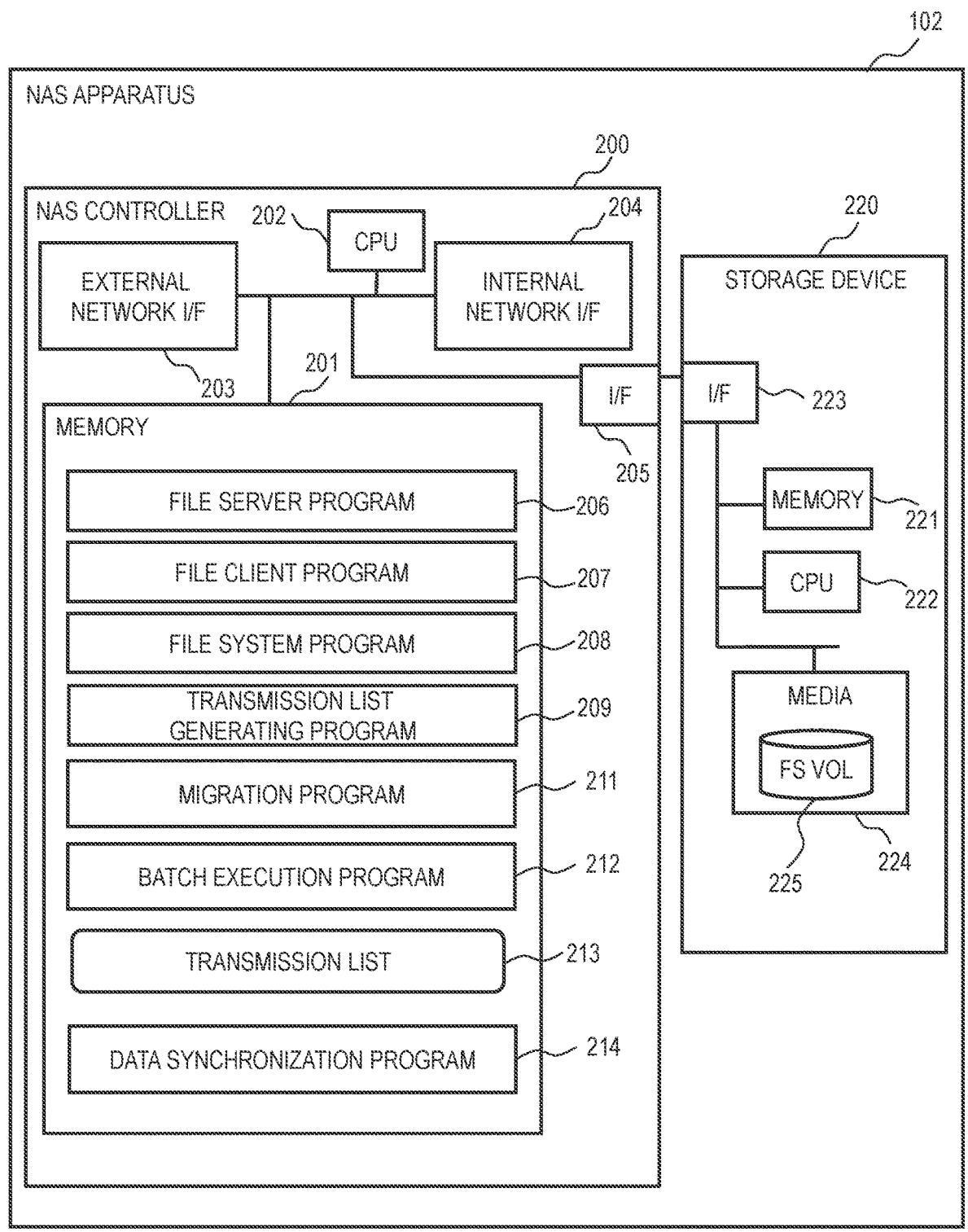
FIG. 2 depicts a configuration example of a NAS apparatus.

FIG. 2 depicts an example of system configuration of the NAS apparatus 102. FIG. 2 depicts the NAS apparatus 102 of the site A 100, and the NAS apparatus 112 of the site B 110 may have the same configuration. The NAS apparatus 102 includes a NAS controller 200 and a storage device 220.

The NAS controller 200 includes a memory 201, a CPU (Central Processing Unit) 202, an external network interface (I/F) 203, an internal network interface 204, and an interface 205. These components are connected by a bus.

The memory 201 stores programs and data used by the CPU 202. The CPU 202 executes programs stored in the memory 201. The external network interface 203 is connected the client 101 via the network 105. The internal network interface 204 is connected the data center 120 via the network 130. The interface 205 is connected with the storage device 220.

The memory 201 stores a file server program 206, a file client program 207, a file system program 208, a transmission list generating program 209, a migration program 211, a batch execution program 212, a transmission list 213, and a data synchronization program 214. The memory 201 stores other programs (not shown) including the OS. Programs and data stored in the memory 201 are also stored in the storage device 220 and loaded into the memory 201 by the CPU 202.

The CPU 202 is a processor, and a program executed by the processor performs a predetermined process while using other devices. Therefore, in the present disclosure, the explanation with a program as a subject may be an explanation with the processor as the subject. Processing executed by a program is performed by the computer or the system on which the program runs.

The processor acts as a functional unit (means) for realizing a predetermined function by acting according to a program. For example, the processor functions as a file server part by operating according to the file server program 206. The same applies to other programs. A computer and a computer system are an apparatus and a system including the functional parts (means), respectively.

The program can be installed in each computer by a program distribution server or a computer readable non-transitory storage medium, and can be stored in a nonvolatile storage device of each computer.

The file server program 206 provides means for the client 101 to perform file operations and directory operations on the NAS apparatus 102. The file client program 207 provides means for the NAS apparatus 102 to operate files and directories on the CAS apparatus 121. The file system program 208 is included in the file system 104 and manages the file system volume 225 of the file system 104.

The transmission list generating program 209 generates the transmission list 213. The migration program 211 performs data migration from the NAS apparatus 102 to the CAS apparatus 121. The batch execution program 212 is executed at predetermined or arbitrary times and performs a process of transferring data from the NAS apparatus 102 to the CAS apparatus 121 and incorporating the data stored in the CAS apparatus 121 into the file system 104 of the NAS apparatus 102 by using other programs.

The transmission list 213 shows information on files which were operated on the file system 104 of the NAS apparatus 102. Specifically, the transmission list 213 indicates information on files created, deleted or updated. The transmission list generating program 209 detects file operations by using the monitoring mechanism of the OS and generates the transmission list 213. Details of the transmission list 213 will be described later.

The batch execution program 212 of the NAS apparatus 102 transmits objects of files recorded in the transmission list 213 together with respective operation instructions of the objects (files) to the CAS apparatus 121. Thus, the file operations in the file system 104 of the NAS apparatus 102 can be incorporated into the file system 114 of the other NAS apparatus 112 via the CAS apparatus 121. Detailed processing of the batch execution program 212 will be described later.

The data synchronization program 214 performs a process of synchronizing (matching) the file system 104 of the NAS apparatus 102 with the file system 122 of the CAS apparatus 121. Detailed processing of the data synchronization program 214 will be described later.

The file sharing system 10 incorporates updates in the file systems 104 and 114 of the NAS apparatuses 102 and 112 into the file system 122 of the CAS apparatus 121 and further incorporates updates in the file system 122 of the CAS apparatus 121 into the file systems 104 and 114 of the NAS apparatuses 102 and 112. Thus, the file systems 104 and 114 of the NAS apparatuses 102 and 112 coincide with each other, realizing file sharing of the NAS apparatuses 102 and 112.

The storage device 220 includes a CPU 222 for executing programs stored in a memory 221, an interface 223 used for connection with the NAS controller 200, and the memory 221 for storing programs and data. These components are connected by a bus. The storage device 220 further includes a storage medium 224 for storing programs to be executed by the CPU 222 and data transmitted via the interface 223.

The storage medium 224 further stores a file system volume 225 included in the file system 104. The file system volume 225 stores information on the namespace and files in the file system 104. A file includes user data (content) and metadata in the file.

Figure 3:
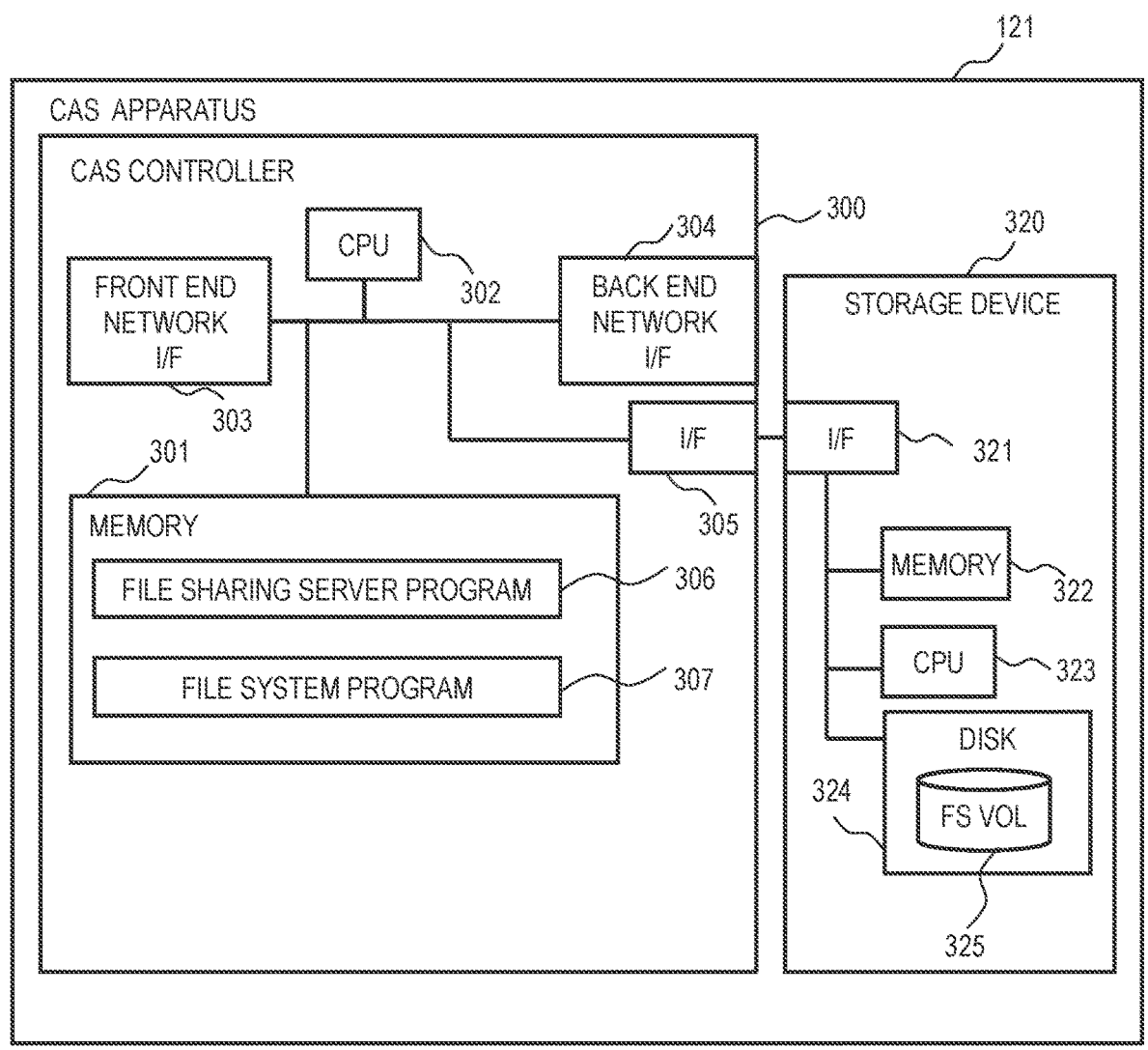
FIG. 3 depicts a configuration example of a CAS apparatus.

FIG. 3 depicts a configuration example of the CAS apparatus 121. The CAS apparatus 121 includes a CAS controller 300 and a storage device 320. The CAS controller 300 includes a memory 301, a CPU 302, a front end network interface 303, a back end network interface 304, and an interface 305, which are connected by a bus.

The memory 301 stores programs and data. The CPU 302 executes the programs stored in the memory 301. The front end network interface 303 is used to connect with the NAS apparatus 102 via the networks 105 and 115. The backend network interface 304 is used to connect with the management terminal 124 via the network 123. The interface 305 is used for connection with the storage device 320.

The memory 301 stores a file sharing server program 306 and a file system program 307. The programs 306 and 307 are also stored in the storage device 320 and loaded into the memory 301 by the CPU 302.

The file sharing server program 306 provides the NAS apparatus 102 and the NAS apparatus 112 with functions for operating files and directories in the CAS apparatus 121. The file system program 307 controls the file system 122, and the data (objects) is stored in the storage device 320.

The storage device 320 includes a CPU 323 which executes programs stored in a memory 322, an interface 321 used for connection with the CAS controller 300, and the memory 322 which stores programs and data, which are connected by a bus. The storage device 320 further includes a storage medium 324 for storing programs to be executed by the CPU 323 and data transmitted via the interface 321.

The storage medium 324 stores a file system volume 325. The file system program 307 and the file system volume 325 constitute the file system 122. The file system volume 325 stores objects and is operated by the file system program 307. The file system volume 325 is shared by the NAS apparatuses 102 and 103, and the file system volume 225 of each of the NAS apparatuses 102 and 103 stores cache data of the file system volume 325.

Figure 4:
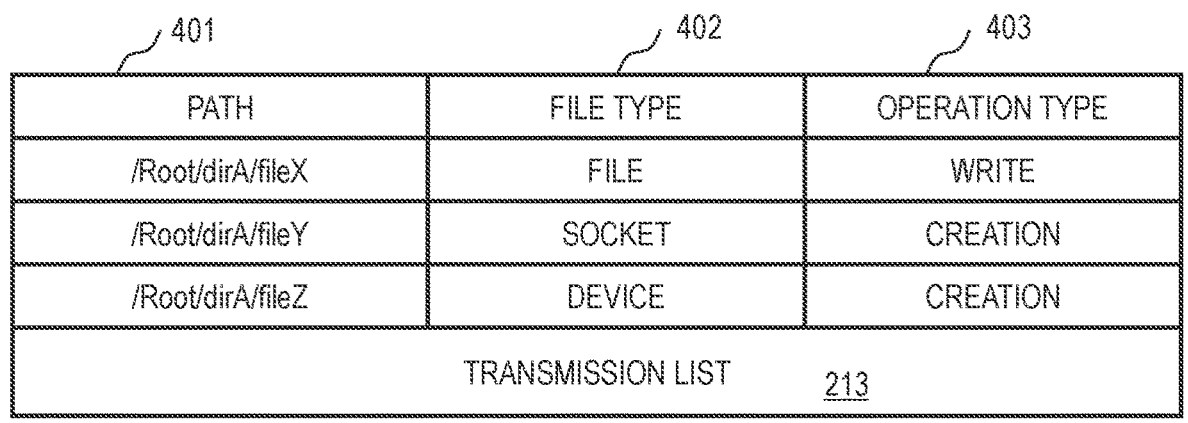
FIG. 4 depicts a configuration example of a transmission list.

FIG. 4 depicts a configuration example of the transmission list 213 created by the NAS apparatus 102/202. The transmission list 213 has a path column 401, a file type column 402, and an operation type column 403. The pass column 401 stores paths of operated files in the file system 104. The file type column 402 stores the types of files indicated by the path column 401. The type of a file includes, for example, a normal file like an office document, a socket, which is a network communication path, a device file, which is a communication path of a connected device, and the like.

The operation type column 403 stores the types of operations performed on files indicated by the path column 401. The operation type includes creation of a file in a file system, deletion of a file from a file system, moving of a file, updating of file data, and the like. Details of the process using the transmission list 213 will be described later.

Figure 5:
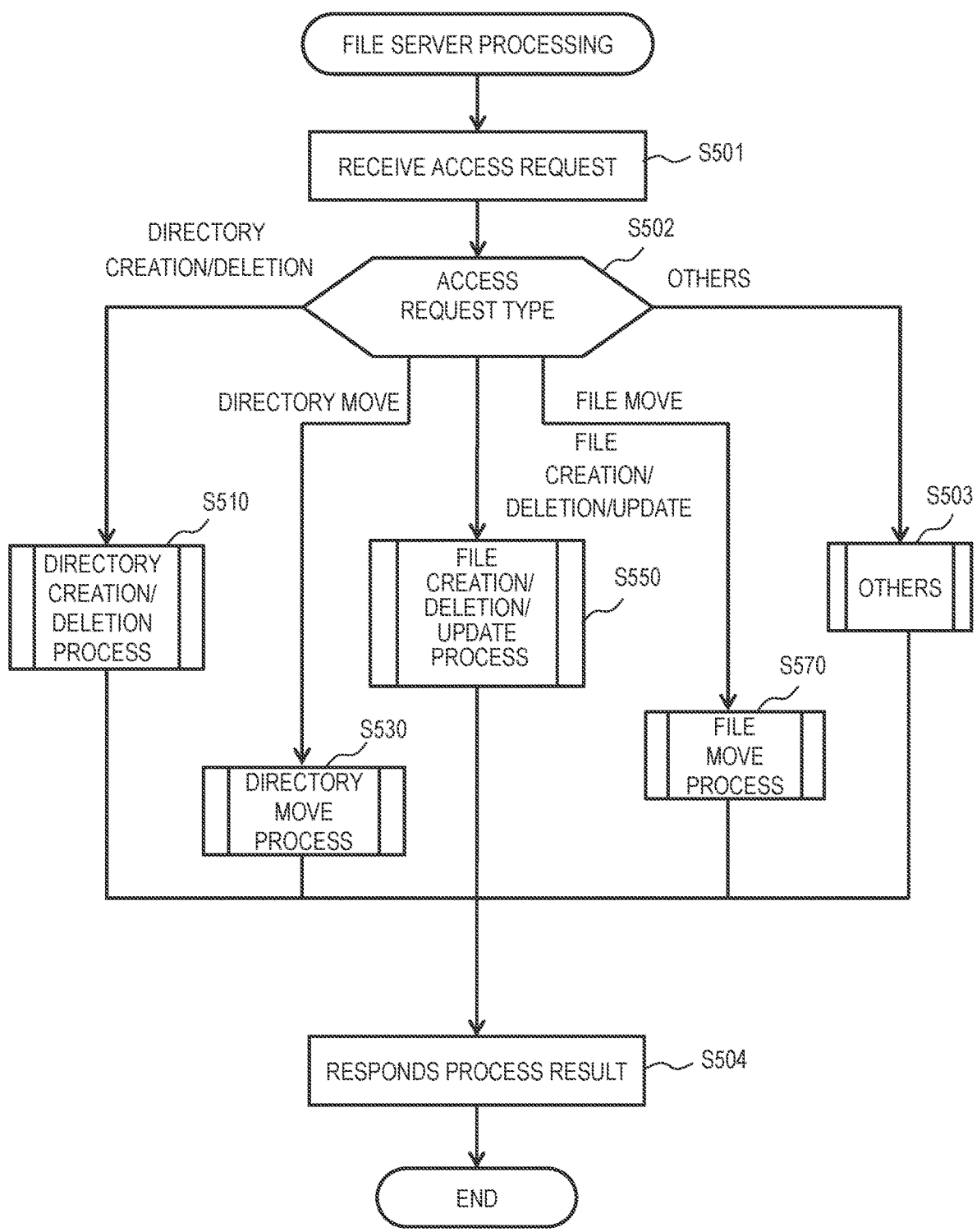
FIG. 5 depicts a flowchart of a file server process executed by the NAS apparatus.

Processing executed by the NAS apparatus 102 will be described below. The NAS apparatus 112 also performs similar processing. FIG. 5 depicts a flowchart of file server processing executed by the file server program 206 of the NAS apparatus 102. Upon receiving an access request from the client 101 (S501), the file server program 206 determines the type of the access request (S502). The type of the access request is included in the directory operation or the file operation.

When the access request is a directory creation request or a directory deletion request (S502: directory creation/deletion), the file server program 206 calls the directory creation/deletion process S510 (file system program 208). Directory creation/deletion is creation or deletion of a directory. When the access request is a directory move request (S502: directory move), the file server program 206 calls the directory move process S530 (file system program 208).

When the access request is a file creation/deletion/update request (S502: file creation/deletion/update), the file server program 206 calls the file creation/deletion/update process S550 (file system program 208). When the access request is a file move request (S502: file move), the file server program 206 calls the file move process S570 (file system program 208).

When the access request is another kind of access request (S502: others), the file server program 206 calls a program executing the process S503. Other processes include, for example, processes on a file or a directory by a general file server, such as file opening, file reading, and directory referencing.

Upon completion of each process, the file server program 206 responds the process result to the client 101 (S504) and terminates the process.

Figure 6:
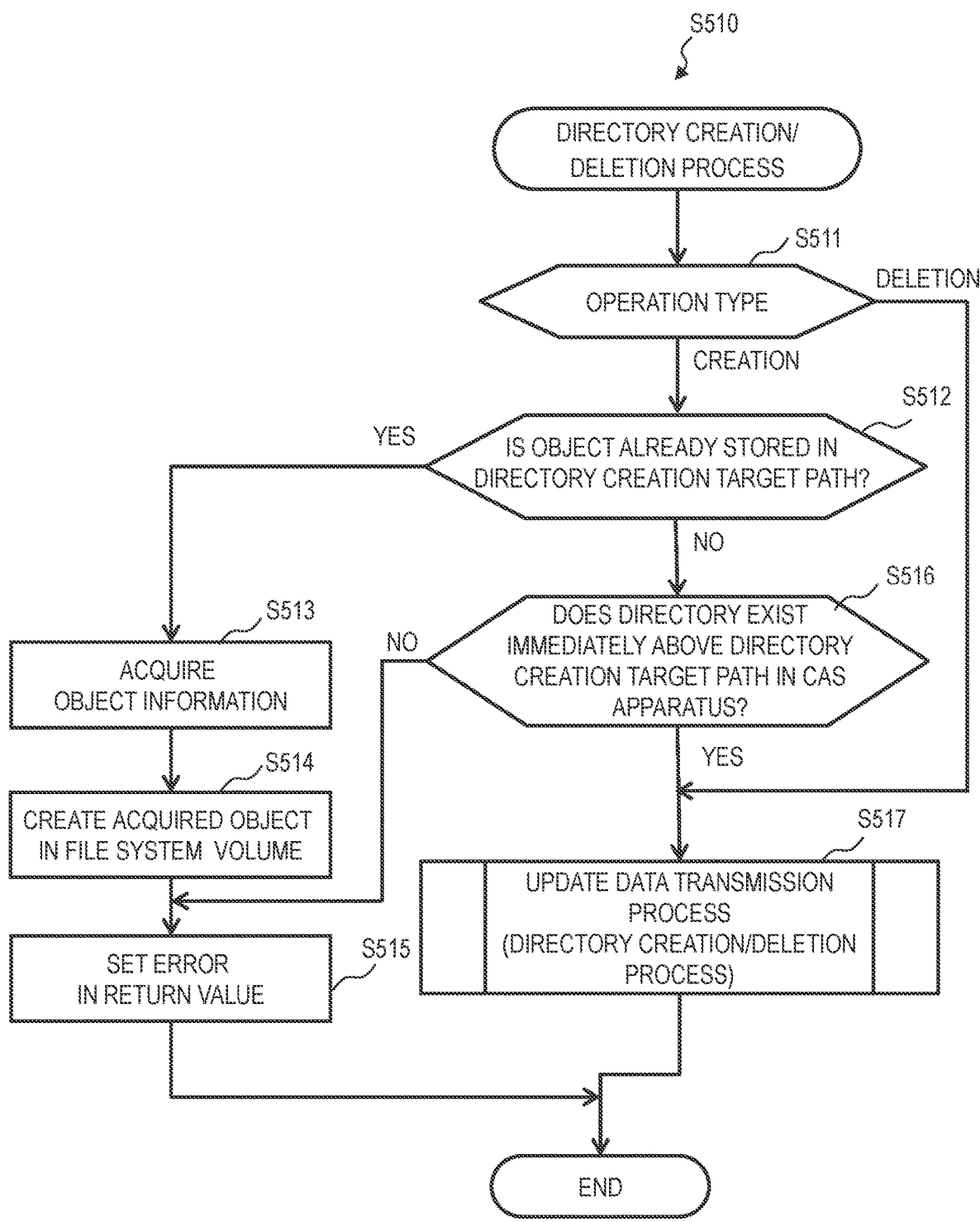
FIG. 6 depicts a flowchart of a directory creation/deletion process executed by the NAS apparatus.

FIG. 6 depicts a flowchart of directory creation/deletion process S510 executed by the file system program 208. Upon accepting an access request, the file system program 208 determines the operation type indicated by the access request (S511).

When the operation type is directory deletion (S511: deletion), the file system program 208 calls the update data transmission process S517 (migration program 211). At this time, the file system program 208 indicates that it is a call from the directory creation/deletion process. The indication uses, for example, a flag. Details of the update data transmission process S517 will be described later. When the update data transmission process S517 is completed, the directory creation/deletion process S510 ends.

When the operation type is directory creation (S511: creation), the file system program 208 checks whether an object is already stored in the same path as the directory creation target path in the file system 122 of the CAS apparatus 121 (S512).

Specifically, the file system program 208 instructs the file client program 207 to issue an inquiry to the CAS apparatus 121. The file client program 207 inquires of the CAS apparatus 121 whether an object exists of the target path of the CAS apparatus 121. An object can be specified by the object ID. The file sharing server program 306 of the CAS apparatus 121 acquires an answer to the inquiry from the file system program 307 and returns a response to the NAS apparatus 102. Upon receiving the response via the file client program 207, the file system program 208 performs the determination of step S512 according to the response.

When an object exists (S512: YES), the file system program 208 acquires the information on the object from the CAS apparatus 121 (S513). Then, the file system program 208 creates an object in the file system volume 225 based on the information on the object (S514). Thus, it is possible to match the object of the target path in the NSA apparatus 102 with the latest object in the CAS apparatus 121 without waiting for the data synchronization process S602 to be described later. Next, the file system program 208 sets an error (an object already exists) in the return value (S515) and ends the process.

On the other hand, if an object does not exist (S512: NO), the file system program 208 inquires of the CAS 121 whether the parent directory of the object exists (S516). The inquiry method may be the same as step S512. If the parent directory is does not exist (S516: NO), the file system program 208 sets an error (already exists) in the return value (S515).

When the parent directory exists (S516: YES), the file system program 208 calls the update data transmission process S517. The call is as described above. When the update data transmission process S517 is completed, the directory creation/deletion process S510 ends. As described above, acquisition of the information on the target object in the file system volume 325 from the CAS apparatus 121 allows appropriate determination whether an directory operation should be permitted or not.

Figure 7:
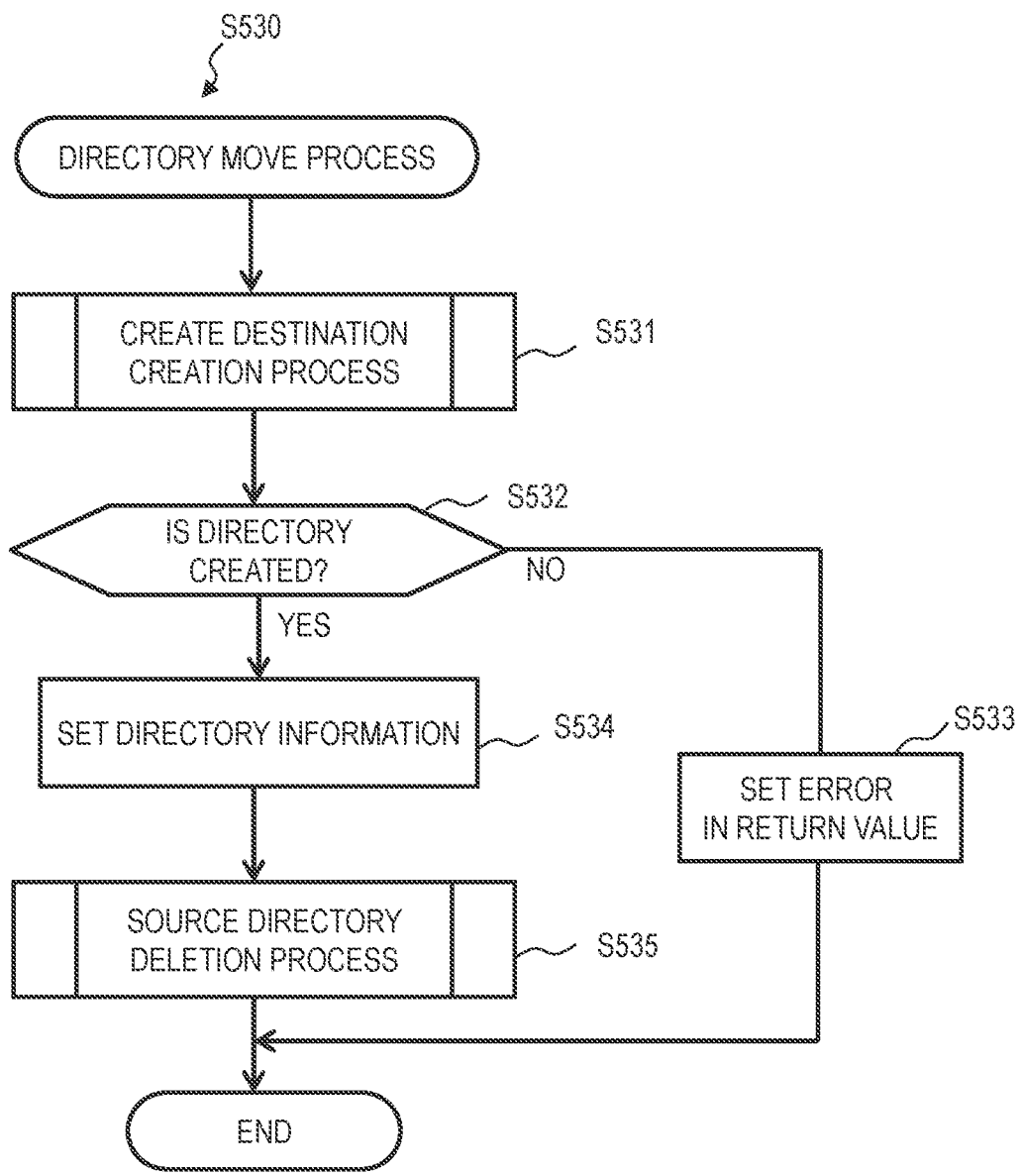
FIG. 7 depicts a flowchart of a directory migration process executed by the NAS apparatus.

FIG. 7 depicts a flowchart of the directory move process S530 executed by the file system program 208. Upon receiving the directory move request, the file system program 208 creates the move destination directory (S531). The creation of the move destination directory is as described with reference to the flowchart of FIG. 6.

When the directory is not created in step S531 (S532: NO), the file system program 208 sets an error in the return value (S533) and ends the process.

If the directory is created in step S531 (S532: YES), the file system program 208 sets, in the move destination directory, information on the move source directory such as the object type, the directory creation date and time, and the access authority, and new information due to the move like the update date and time (S532). Further, the file system program 208 deletes the move source directory (S533). The deletion of the move source directory is as described with reference to the flowchart of FIG. 6.

The move of a directory includes a change of the directory name. Specifically, changing the directory name corresponds to moving the directory of the new name to the same path.

Figure 8:
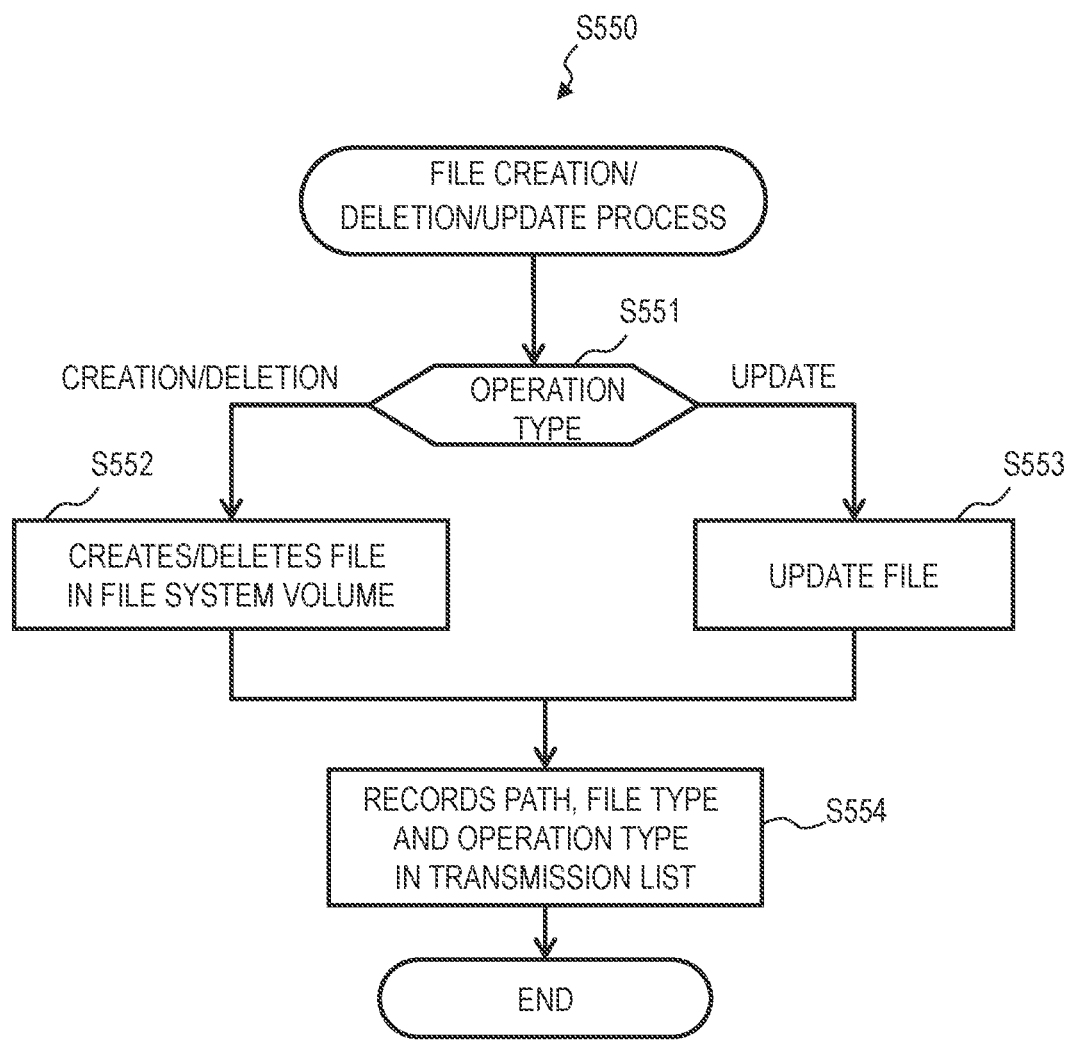
FIG. 8 depicts a flowchart of a file creation/deletion/update process executed by the NAS apparatus.

FIG. 8 depicts a flowchart of a file creation/deletion/update process S550 executed by the file system program 208. The file includes a normal file such as an office document and a text file, a special file such as a socket file indicating a network communication path and the like, and generally refers to a file which is not a directory.

Upon accepting an access request, the file system program 208 determines the operation type of the access request (S551). When the operation type is creation or deletion of a file (S551: creation/deletion), the file system program 208 creates/deletes a file in the file system volume 225 (S552).

On the other hand, when the operation type is update of a file (S552: update), the file system program 208 updates the file stored in the file system volume 225 (S553). Updating of a file refers to rewriting the content of the file, the metadata of the file or the like.

Finally, the file system program 208 requests the transmission list creation program 209 to create a transmission list, and records, via the transmission list generation program 209, the path of the file created/deleted/updated in the pass column 401 of the transmission list 213, the file type of the file created/deleted/updated in the file type column 402, and the operation type in the operation type column 403 (S554), and ends the process.

As described above, the cache data of creation/deletion/update of the file in the file system 104 (file system volume 225) of the NAS apparatus 102 is not immediately transmitted to the file system 122 of the CAS apparatus 121, and information on the file operation is only stored into the transmission list 213. Therefore, the user standby time can be shortened. Then, the process is terminated. As described later, the result of file creation/deletion/update is transmitted to the CAS apparatus 121 together with the results of other file operations.

The file move process S570 can be executed in the same manner as the directory move process S530. Specifically, the file system program 208 executes a move destination file creation process, information setting of the move destination file, and a deletion process of a move source file. The flow of the move destination file creation process and the move source file deletion process are as described with reference to FIG. 8.

Figure 9:
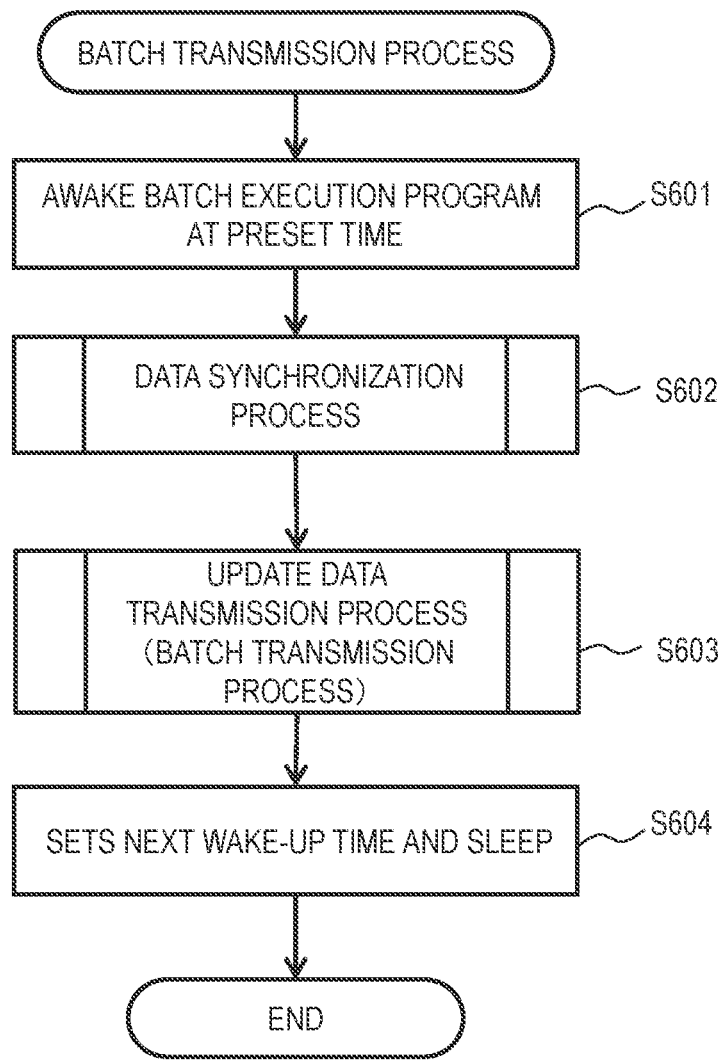
FIG. 9 depicts a flowchart of a batch transmission process executed by the NAS apparatus.

FIG. 9 depicts a flowchart of a batch transmission process executed by the batch execution program 212. For example, the batch execution program 212 is called for executing the batch transmission process from a timer function of the OS of the NAS 102 apparatus (S601). Next, the batch execution program 212 calls the data synchronization program 214 and causes the data synchronization program 214 to execute the data synchronization process S602 described later.

Next, the batch execution program 212 calls the migration program 211 and causes the migration program 211 to execute the update data transmission process S603 to be described later. The batch execution program 212 notifies the migration program 211 that the call is a batch process call. The notice is given by using, for example, a flag. The migration program 211 executes processing based on the instruction. Details of the update data transmission process S603 by the migration program 211 will be described later.

Upon completion of the update data transmission process S603, the batch execution program 212 sets the next wake-up time in the timer function of the OS and sleeps (S604). Activation of the batch execution program 212 by the timer function is an example, and the batch execution program 212 may start processing when other prescribed conditions like the number of records of the transmission list 213 are satisfied.

Figure 10:
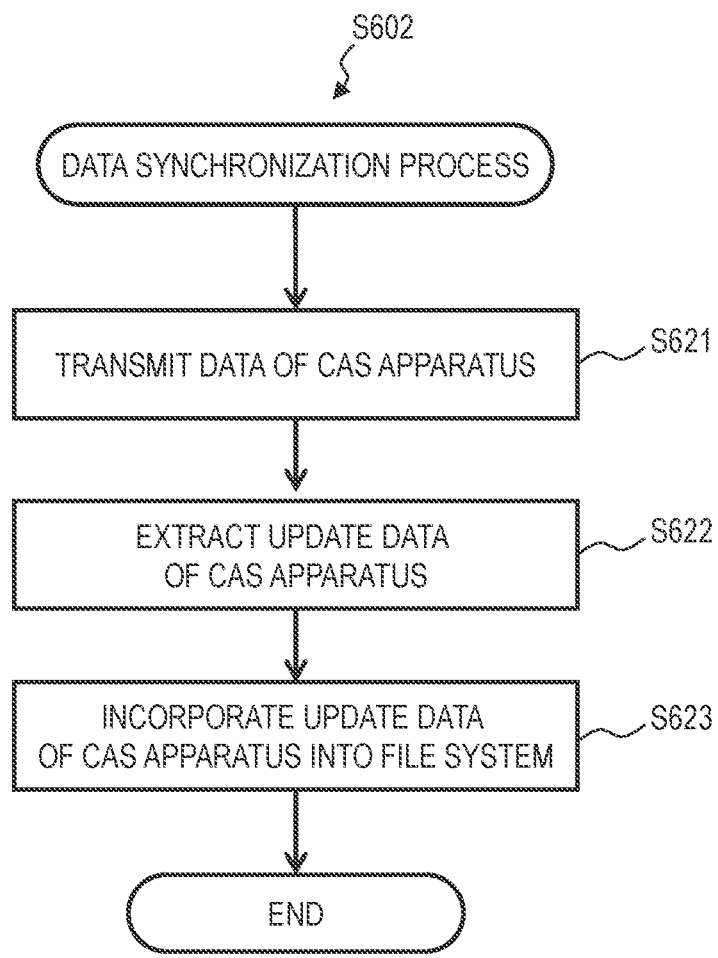
FIG. 10 depicts a flowchart of a data synchronization process executed by the NAS apparatus.

FIG. 10 depicts a flowchart of the data synchronization process S602 executed by the data synchronization program 214. The data synchronization program 214 receives data stored in the file system volume 325 of the CAS apparatus 121 from the CAS apparatus 121 (S621). The data includes objects, and includes files and information on a file tree.

The data synchronization program 214 compares the data stored in the file system volume 325 of the CAS apparatus 121 with the data stored in the file system volume 225 of the NAS apparatus 102 and extracts the update data in the CAS apparatus 121 (S622). In the extraction of the update data, the objects registered in the transmission list 213 are excluded.

The update data indicates the difference between the file system volumes 225 and 325. For example, a directory added or deleted, a file added, deleted or updated in the file system volume 225, and the like are shown.

The data synchronization program 214 incorporates (synchronizes) the update data of the extracted CAS apparatus 121 into the file system volume 225 of the NAS apparatus 102 (S623), and matches the files not registered in the transmission list 213 and the directories between the CAS apparatus 121 and the NAS apparatus 102.

For extracting the update data of the CAS 121 apparatus, a plurality of methods are conceivable, such as a method for the NAS apparatus 102 to compare the data stored in the NAS apparatus 102 and the data stored in the CAS apparatus 121, and a method for the CAS 121 apparatus to extract the update data.

Incorporation of the update data from the CAS apparatus 121 into the NAS apparatus 102 may be carried out at the time of calling from the batch execution program 212 or at the time of an access request from the client 101 to a file or a directory for example. The data synchronization process S602 allows an object operation in the file system volume 325 of the CAS apparatus 121 by another NAS apparatus to be incorporated into the file system volume 225 of the NAS apparatus 102.

Figure 11:
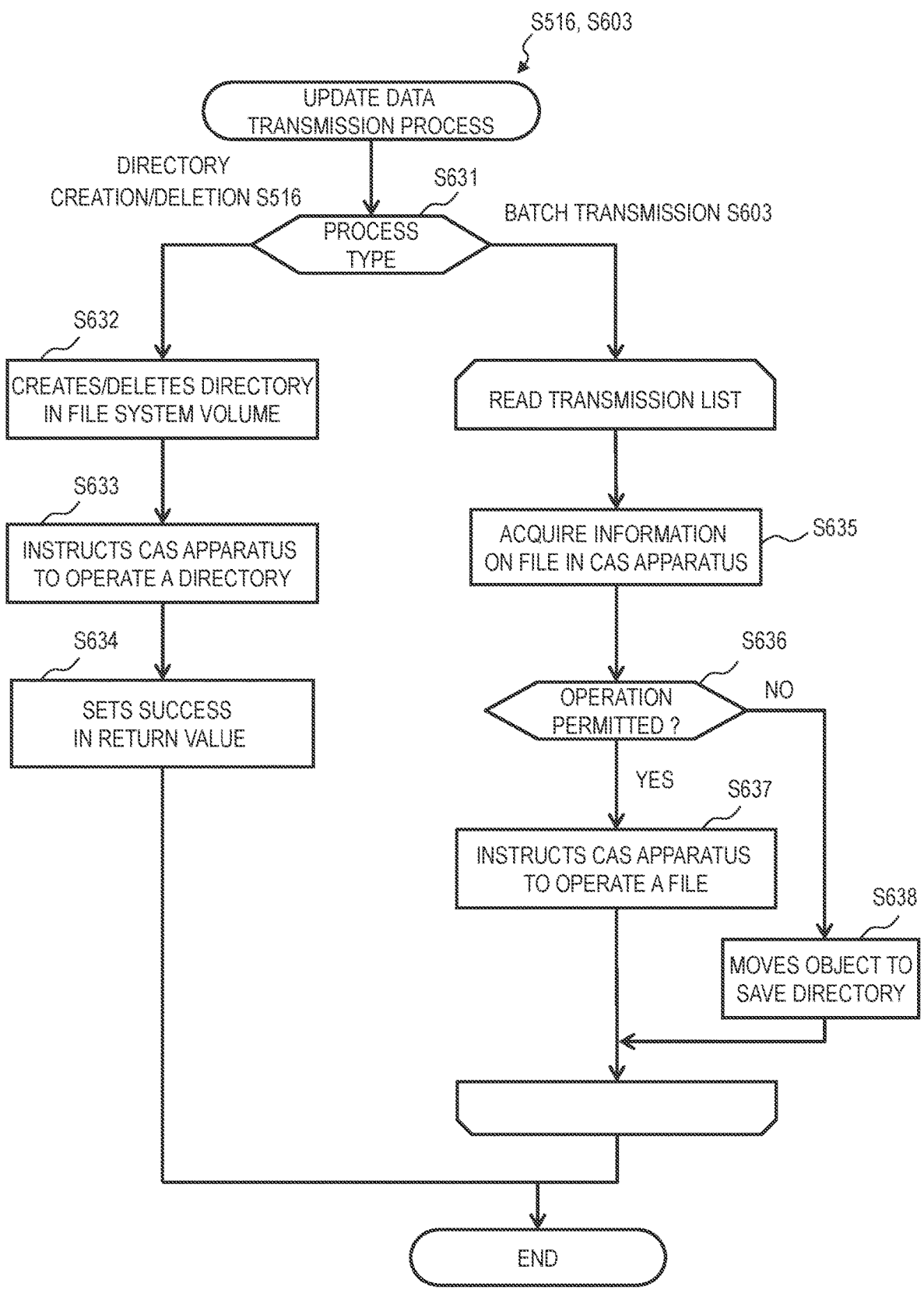
FIG. 11 depicts a flowchart of a update data transmission process executed by the NAS apparatus.

FIG. 11 depicts a flowchart of the update data transmission processes S517 and S603 executed by the migration program 211. The update data transmission process S517 is called in the directory creation/deletion process S510 shown in FIG. 6, and the update data transmission process S603 is called in the batch transmission process shown in FIG. 9.

In the example described below, the file updating follows the first win rule. In other words, if there are updates to be incorporated by multiple NAS apparatuses for the same file, the first update is incorporated and later updates are prohibited. The file updating may follow the later winning rule in which new data is always overwritten on the file.

Upon receiving an update data transmission process request, the migration program 211 determines the process type (S631). The migration program 211 determines the process type with reference to, for example, a flag acquired from the calling program. When the process type is the directory creation/deletion (S631: directory creation/deletion), the migration program 211 creates/deletes a directory in the file system volume 225 (S632).

The migration program 211 instructs the CAS apparatus 121 to operate a directory (S633). Specifically, in creating a directory, the migration program 211 creates an object to be transmitted and transmits the object together with an instruction to create the object. In directory deletion, the migration program 211 transmits an object deletion instruction designating a directory (object).

The migration program 211 calls the file client program 207 in the directory operation instruction. The file client program 207 connects to the file sharing server program 306 of the CAS apparatus 121 and acquires the lock. The lock is for the entire name space of the CAS apparatus 121 or a part including the target directory.

The file sharing server program 306 of the CAS apparatus 121 requests the file system program 307 of the CAS apparatus 121 to delete or store an object. The file system program 307 stores the received object in the file system volume 325 or deletes the designated object. The file sharing server program 306 transmits the process result (completion response) to the NAS apparatus 102, and the file client program 207 releases the lock.

Finally, the migration program 211 sets the return value (success) of the process (S634), and ends the update data transmission process S517.

When the process type is the batch transmission (S631: batch transmission), the migration program 211 sequentially reads the records of the transmission list 213 and iteratively executes steps S635 to S638. When processing of all the records in the transmission list is completed, the migration program 211 ends the update data transmission process S603. Processing collectively a plurality of records in the transmission list 213 realizes efficient processing while suppressing migration delay of file operations. It should be noted that only a part of the records of the transmission list 213 may be selected for one batch transmission process.

The processing of each record will be described in detail. The migration program 211 acquires the information on the target object from the data of the file system volume 325 of the CAS apparatus 121 acquired in the data synchronization process S602 (S635). Further, the migration program 211 determines permission/prohibition of the operation from the information on the target object in the CAS apparatus 121 (S636).

When the operation type indicated by the operation type column 403 is the file creation, the migration program 211 checks whether the object (file) indicated by the pass column 401 exists in the file system volume 325 of the CAS apparatus 121.

When an object exists, the NAS apparatus 112 of another site has already created the object in the path. Therefore, the migration program 211 prohibits the file operation in the CAS apparatus 121 (S636: NO). When the parent directory of the target file path does not exist, the migration program 211 prohibits the file operation in the CAS apparatus 121 (S636: NO).

If the parent directory exists and any object does not exist, the migration program 211 permits the file operation in the CAS apparatus 121 (S636: YES).

When the operation type indicated by the operation type column 403 is the file update or the file deletion, the migration program 211 checks whether the object (file) indicated by the pass column 401 exists in the file system volume 325 of the CAS apparatus 121. When the object does not exist, the migration program 211 prohibits the file operation in the CAS apparatus 121 (S636: NO).

When the object exists, the migration program 211 compares the last matching time of the file in the NAS apparatus 102 with the latest update time of the object in the CAS apparatus 121.

The last matching time of the file is the time at which the files was matched or checked for matching between the NAS 102 apparatus and the CAS apparatus 112, and included in the metadata of the file. The file matching is executed in the data synchronization process S602 or the update data transmission process S603, and the checking of the match is executed in the data synchronization process S602.

When the latest update time in the CAS apparatus 121 is later than the last matching time in the NAS apparatus 102, the migration program 211 prohibits the file operation in the CAS apparatus 121 (S636: NO). When the last matching time is the same as or later than the latest update time, the migration program 211 permits the file operation in the CAS apparatus 121 (S636: YES).

When the operation type indicated by the operation type column 403 is the file deletion, the migration program 211 checks whether the object (file) indicated by the pass column 401 exists in the file system volume 325 of the CAS apparatus 121. When the object does not exist, the migration program 211 prohibits the file operation in the CAS apparatus 121 (S636: NO).

When the object exists, the migration program 211 compares the last matching time of the file in the NAS apparatus 102 with the latest update time of the object in the CAS apparatus 121.

When the operation type indicated by the operation type column 403 is the file move, the migration program 211 makes the above determination regarding file deletion at the movement source and file creation at the movement destination.

When the file operation in the CAS apparatus 121 is permitted (S636: YES), the migration program 211 creates an object according to the file type indicated in the file type column 402 of the record in the transmission list 213, transmits the object to the CAS apparatus 121 together with the file operation instruction (S637).

When the file operation on the CAS 121 is prohibited (S636: NO), the migration program 211 moves the created or updated object to the save directory 107 (S638). As a result, the file containing data generated by a user operation and not incorporated into the CAS apparatus 121 is maintained for user confirmation.

As described above, the file sharing system 10 transmits directory operations to the CAS apparatus 121 in synchronization with the access requests from the client, and batch-transmits file operations to the CAS apparatus 121 asynchronously with the access requests from the client. Thus, a directory is not created in the save directory 107, and a decrease in usability of an end user can be suppressed. On the other hand, a file operation by a client is completed by being cached in a file system of a NAS apparatus. Thereby, performance for file operations by users can be enhanced.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A file server apparatus configured to share a first file system volume stored in a shared file storage apparatus with another file server apparatus, and mediate accesses from a client to the first file system volume, the file server apparatus comprising:
    a second file system volume including cache data of the first file system volume; and
    a computer programmed to:
    receive an access request to the first file system volume from the client;
    execute an operation indicated by the access request in the second file system volume; and
    transmit a completion response of the operation to the client,
    wherein, when an operation type indicated by the access request is a directory operation, the computer is further programmed to:
    transmit an instruction of the directory operation to be executed in the first file system volume to the shared file storage apparatus prior to transmitting the completion response to the client, and
    wherein, when the operation type indicated by the access request is a file operation, the computer is further programmed to:
    cache an instruction of the file operation to be executed in the first file system volume in a cache memory of the file server apparatus prior to transmitting the completion response to the client;
    after transmitting the completion response to the client, determine whether the file operation is permitted to be executed in the first file system volume based on a presence or absence of a parent directory indicated by a path of a file of the file operation in the first file system volume; and
    transmit, when the file operation is permitted to be executed in the first file system volume, the cached instruction of the file operation to be executed in the first file system volume to the shared file storage apparatus.

2. The file server apparatus according to claim 1, wherein the computer is programmed to:
    make an inquiry to the shared file storage apparatus concerning a target directory of the directory operation to be executed in the first file system volume; and determine permission/prohibition of the directory operation based on a response to the inquiry.

3. A file server apparatus configured to share a first file system volume stored in a shared file storage apparatus with another file server apparatus, and mediate accesses from a client to the first file system volume, the file server apparatus comprising:
a second file system volume including cache data of the first file system volume; and
a computer programmed to:
receive an access request to the first file system volume from the client;
determine an operation type indicated by the access request;
when the determined operation type is a directory operation:
execute an operation indicated by the access request in the second file system volume,
transmit an instruction of the directory operation to be executed in the first file system volume to the shared file storage apparatus, and
transmit a completion response of the directory operation to the client after transmitting the instruction of the directory operation to be executed in the first file system volume to the shared file storage apparatus; and
when the determined operation type is a file operation:
execute the operation indicated by the access request in the second file system volume,
cache an instruction of the file operation to be executed in the first file system volume in a cache memory of the file server apparatus,
transmit a completion response of the file operation to the client after caching the instruction of the file operation,
determine whether the file operation is permitted to be executed in the first file system volume based on a presence or absence of a parent directory indicated by a path of a file of the file operation in the first file system volume, and
transmit, when the file operation is permitted to be executed in the first file system volume, the cached instruction of the file operation to be executed in the first file system volume to the shared file storage device,
wherein, when the directory operation is prohibited and a target directory in the first file system volume is different from a corresponding target directory in the second file system volume, the computer is programmed to match the target directory in the second file system volume with the target directory in the first file system volume.

4. The file server apparatus according to claim 3,
wherein, the computer is programmed to execute synchronization processing for incorporating update data for the second file system volume in the first file system volume into the second file system volume when a predetermined condition is satisfied, after matching the target directory in the second file system volume with the target directory in the first file system volume.

5. The file server apparatus according to claim 1,
wherein, the computer is programmed to:
temporarily store information on file operations in a list;
sequentially select the file operations in the list;
determine whether each of the selected file operations is permitted to be executed in the first file system volume based on information on a respective file operation object of each of the selected file operations in the first file system volume; and
instruct the shared file storage apparatus to perform each of the file operations which are determined as being permitted.

6. The file server apparatus according to claim 5,
wherein the computer is programmed to move a respective object of each of the file operations determined as being prohibited to a specified directory.

7. A method of controlling a file server apparatus configured to share a first file system volume stored in a shared file storage apparatus with another file server apparatus, and mediate accesses from a client to the first file system volume, the method comprising:
receiving an access request to the first file system volume from the client;
executing an operation indicated by the access request in a second file system volume which includes cache data of the first file system volume; and
transmitting a completion response of the operation to the client,
wherein, when an operation type indicated by the access request is a directory operation, an instruction of the directory operation to be executed in the first file system volume is transmitted to the shared file storage apparatus prior to transmitting the completion response to the client, and
wherein, when the operation type indicated by the access request is a file operation, prior to transmitting the completion response to the client, an instruction of the file operation to be executed in the first file system volume is cached in a cache memory of the file server apparatus, and, after transmitting the completion response to the client, whether the file operation is permitted to be executed in the first file system volume is determined based on a presence or absence of a parent directory indicated by a path of a file of the file operation to be executed in the first file system volume, and
when the file operation is permitted to be executed in the first file system volume, the cached instruction of the file operation to be executed in the first file system volume is transmitted to the shared file storage apparatus.

8. The method according to claim 7, further comprising:
making an inquiry to the shared file storage apparatus concerning a target directory of the directory operation to be executed in the first file system volume; and
determining permission/prohibition of the directory operation based on a response to the inquiry.

9. A method of controlling a file server apparatus configured to share a first file system volume stored in a shared file storage apparatus with another file server apparatus, and mediate accesses from a client to the first file system volume, the method comprising:
receiving an access request to the first file system volume from the client;
determining an operation type indicated by the access request;
when the determined operation type is a directory operation:
executing an operation indicated by the access request in the second file system volume,
transmitting an instruction of the directory operation to be executed in the first file system volume to the shared file storage apparatus, and transmitting a completion response of the directory operation to the client after transmitting the instruction of the directory operation to be executed in the first file system volume to the shared file storage apparatus; and when the determined operation type is a file operation:

executing the operation indicated by the access request in the second file system volume, caching an instruction of the file operation to be executed in the first file system volume in a cache memory of the file server apparatus, transmitting a completion response of the file operation to the client after caching the instruction of the file operation to be executed in the first file system volume, determining whether the file operation is permitted to be executed in the first file system volume based on a presence or absence of a parent directory indicated by a path of a file of the file operation to be executed in the first file system volume, and transmitting, when the file operation is permitted to be executed in the first file system volume, the cached instruction of the file operation to be executed in the first file system volume to the shared file storage device, and matching, when the directory operation is prohibited and a target directory in the first file system volume is different from a corresponding target directory in the second file system volume, the target directory in the second file system volume with the target directory in the first file system volume.

10. The method according to claim 9, further comprising:
executing synchronization processing for incorporating update data for the second file system volume in the first file system volume into the second file system volume when a predetermined condition is satisfied, after matching the target directory in the second file system volume with the target directory in the first file system volume.

11. The method according to claim 7, further comprising:
temporarily storing information on file operations in a list;
selecting the file operations in the list;
sequentially determining whether of each of the selected file operations is permitted to be executed in the first file system volume based on information on a respective file operation object of each of the selected file operations in the first file system volume; and
instructing the shared file storage apparatus to perform each of the file operations determined as being permitted.

12. The method according to claim 11, further comprising moving a respective object of each of the file operations determined as being prohibited to a specified directory.

* * * * *